United States Patent
Kiernan

(10) Patent No.: US 6,766,023 B2
(45) Date of Patent: Jul. 20, 2004

(54) TELEPHONE KEY ARRANGEMENT WITH TACTILE INDICATING MEANS

(75) Inventor: Louise Kiernan, Co. Clare (IE)

(73) Assignee: Molex Incorporated, Lisle, IL (US)

( * ) Notice: Subject to any disclaimer, the term of this patent is extended or adjusted under 35 U.S.C. 154(b) by 562 days.

(21) Appl. No.: 09/781,797

(22) Filed: Feb. 12, 2001

(65) Prior Publication Data

US 2002/0110238 A1 Aug. 15, 2002

(51) Int. Cl.⁷ .............................................. H04M 1/00
(52) U.S. Cl. ............................ 379/433.07; 379/88.01; 379/368; 379/433.01; 379/387.01
(58) Field of Search .......................... 379/433.07, 368, 379/369, 387.01, 433.01; 341/22; 345/160; 400/489; 455/552.1–553.1

(56) References Cited

U.S. PATENT DOCUMENTS

| | | | | |
|---|---|---|---|---|
| 5,332,322 A | * | 7/1994 | Gambaro | 400/489 |
| 5,479,163 A | * | 12/1995 | Samulewicz | 341/22 |
| 5,509,048 A | | 4/1996 | Meidan et al. | 379/58 |
| 5,917,906 A | | 6/1999 | Thornton | 379/433 |
| 5,926,119 A | | 7/1999 | Lindeman et al. | 341/22 |
| 6,067,358 A | * | 5/2000 | Grant | 379/433 |
| 6,297,806 B1 | * | 10/2001 | Skoog | 345/160 |

FOREIGN PATENT DOCUMENTS

| | | | |
|---|---|---|---|
| GB | 2 240 071 A | 7/1991 | H04M/1/23 |
| GB | 2 332 172 A | 6/1999 | B41J/5/10 |
| WO | WO 98/54878 | 12/1998 | H04M/1/00 |
| WO | WO 99/48120 | 9/1999 | H01H/13/70 |

* cited by examiner

Primary Examiner—Jack Chiang
Assistant Examiner—M. C. Ubiles
(74) Attorney, Agent, or Firm—Stephen Z. Weiss

(57) ABSTRACT

A key arrangement for a telephone including a common plane in which all of the keys are arranged, the plane having a radial focal point and a peripheral area about the focal point. A set of twelve independently manually actuable keys are arranged in the plane with each key having an upper contact surface. Ten of the keys are arranged radially on the peripheral area of the plane about the focal point of the plane along a path defining a closed curve. Two keys are located at opposite sides of the radial focal point. Each key also has means for tactily indicating its position with respect to the other keys including the cross sectional shape of the upper contact surface of each key having a slope indicating the radial location from the central axis of the key arrangement.

14 Claims, 2 Drawing Sheets

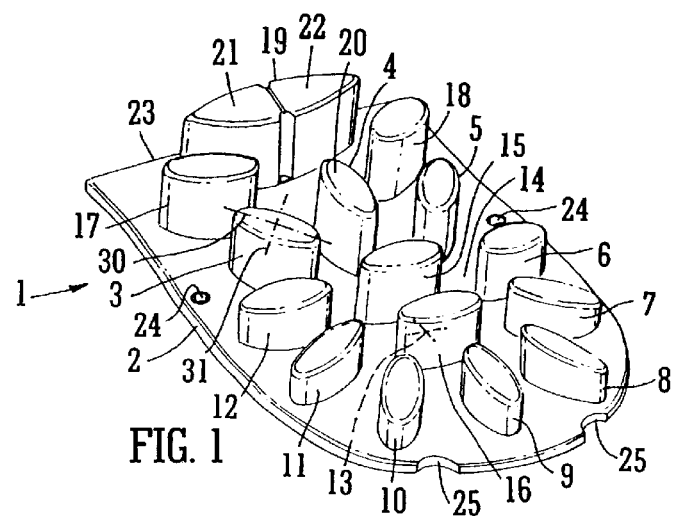
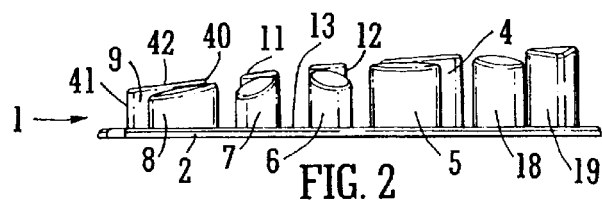
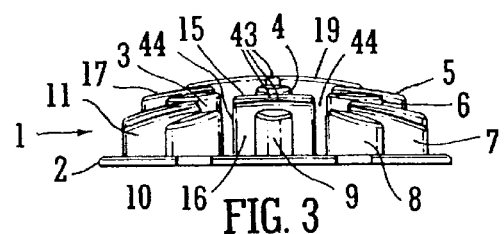
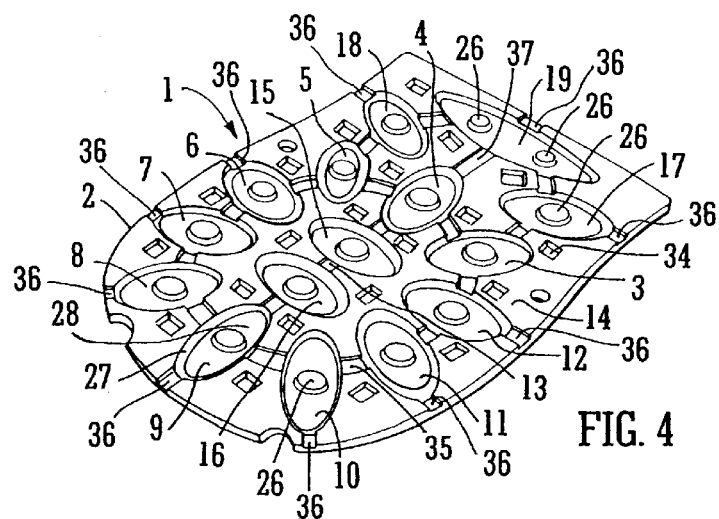

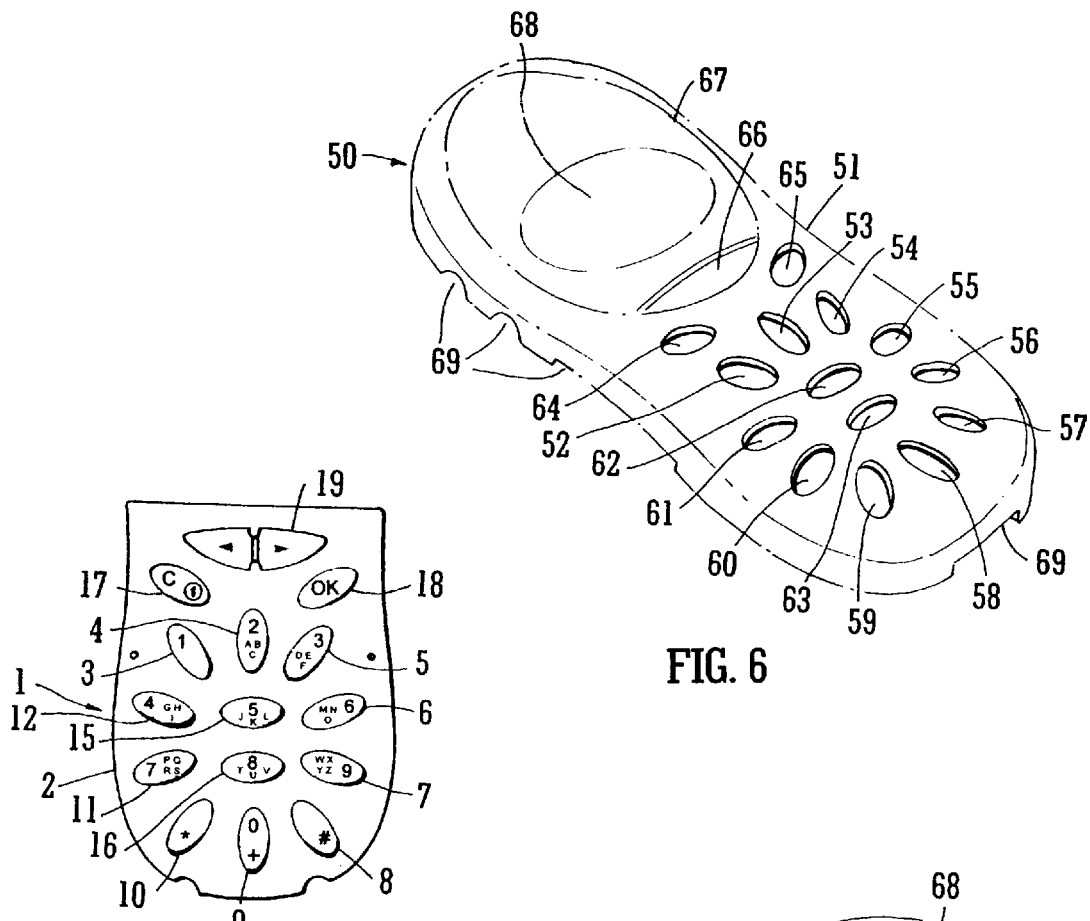
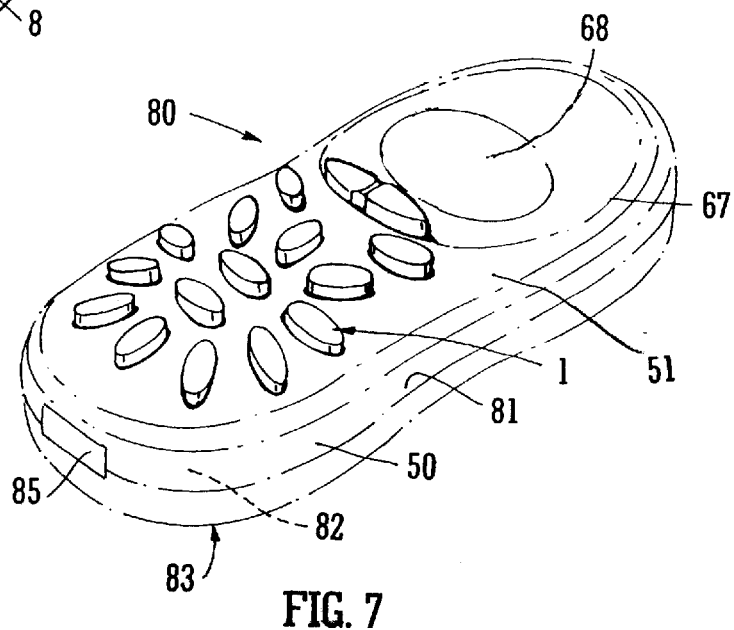
FIG. 5
FIG. 6
FIG. 7

TELEPHONE KEY ARRANGEMENT WITH TACTILE INDICATING MEANS

FIELD OF THE INVENTION

The present invention relates to a radial arrangement of keys in a telephone, the keys having means for tactically indicating the relative location of each key. The key arrangement is particularly suited to mobile phones.

BACKGROUND TO THE INVENTION

Telephones and in particular mobile telephones have become widely available and have many different shapes and configurations. Despite the large number of independent manufacturers some features of telephones are used in most types of telephones. One feature which is common to many is the keypad for inputting numbers, text and functions. The key arrangement must have a minimum of ten individual keys, one key for each digit from zero to nine. Each key is also usually assigned one or more other characters such as letters which can be input utilizing the digit keys by selecting a letter input mode of the key arrangement.

The layout of the key arrangement has become standardized over the years. In the conventional layout the ten keys of the key arrangement discussed above are laid out in a set format. Usually the keys are laid out in a rectangular matrix array which has a number of parallel linear rows running transversely across the telephone, each row typically having 3 or 4 spaced apart keys and a number of parallel linear columns running perpendicularly to the rows each of about five spaced apart keys so that each key is arranged on the intersection of one row and one column. Additional keys are more commonly provided for other characters or functions, as for example, a hash "#" key and an asterisk "*" key. These latter two keys are provided in the same array as the other keys. Other keys which may be provided with mobile telephones may include a call initiation key, a call termination key and one or more other function select keys. A more recent addition to the key arrangement in mobile telephones is a scroll key which may allow scrolling in two directions, such as from left to right or in four directions including left and right and also up and down.

The conventional arrangement has been in use for some time and there are associated undesirable problems for at least some key arrangements. Particularly for mobile telephones there is a desire to make the telephone ever more compact requiring the compression of the features of the telephone including the key arrangement. Miniaturization of the keys presents some difficulty for a human finger to easily press only one rather than two or more keys at the same time. With smaller key arrangements knowledge of the key location without the need for total visual confirmation is important. Tactile feedback from the keys will help the user located the keys.

SUMMARY OF THE INVENTION

An object, therefore, of the invention is to provide a new and improved arrangement of keys which presents less difficulty to find the location of the keys with little or no visual confirmation of the key location. Such an arrangement includes means for providing tactile feedback of the key's location. In the exemplary embodiment of the invention the keys are all located in one plane in the telephone. The plane has a radial focal point and a peripheral area about the focal point. A set of at least nine independently manually actuable keys are arranged in the plane. Each key has an upper contact surface. Eight of the keys are radially arranged on the peripheral area of the plane about the focal point of the plane along a path defining a closed curve. One key is located at the focal point. Each key has means for tactily indicating its position with respect to all of the other keys.

As disclosed herein the tactile indicating means may include a cross sectional shape of the upper contact surface of each key. The shape of the upper contact surface of each key includes a major axis and a minor axis and the major axis of each radially arranged key may be designed to extend through the radial focal point. The tactile indicating means may also include a slope on the upper contact surface of each key. The slope will create one tall side and one short side, a line between the tall and short side of each radially located keys may pass through the radial focal point of the plane.

Preferably the keys are spaced apart equidistant from one another. The arrangement may include at least one of the additional key positioned within the area bounded by the radially arranged keys. A further embodiment may have at least twelve keys, ten of the keys radially arranged on the peripheral area about the focal point of the plane and two keys arranged at opposite sides of the focal point. Another embodiment may have all of the keys formed in one key pad.

Other objects, features and advantages of the invention will be apparent from the following detailed description taken in connection with the accompanying drawings

BRIEF DESCRIPTION OF THE DRAWINGS

The features of this invention which are believed to be novel are set forth with particularity in the appended claims. The invention, together with its objects and the advantages thereof, may be best understood by reference to the following drawings, in which like reference numerals identify like elements in the Figures and in which:

FIG. 1 is a perspective view of one embodiment of a key arrangement of the present invention;

FIG. 2 is a side elevational view from the right side thereof;

FIG. 3 is an end view thereof;

FIG. 4 is a perspective view of an underneath side thereof;

FIG. 5 is a plan view of the key arrangement of FIG. 1 with one assignment of digits/characters/functions;

FIG. 6 is a perspective view of a front cover of the present invention particularly suited for attachment to a mobile telephone handset; and FIG. 7 is a perspective view of the key arrangement of FIG. 1 and the front cover of FIG. 6 assembled in a typical mobile telephone handset.

DETAILED DESCRIPTION OF THE DRAWINGS

Referring to the drawings in greater detail, and first to FIG. 1, the invention is embodied in a key arrangement for a mobile telephone. The key arrangement 1 comprises a support in the form of a pad 2 which takes the form of a flexible membrane. In many key arrangements the support takes this form but it will be appreciated that individual keys could be provided for independent assembly into a telephone. In such a case that part of the telephone which holds the keys in place over their respective contact areas can be considered the support part of the key arrangement. A temporary support may be provided for the keys. For example the keys could be made together in a frangible array for later assembly, one by one or simultaneously, into the telephone which will thereafter hold the keys in the desired arrangement. Such supports may form the support for a key arrangement of the invention. The key arrangement 1 has a set of nine independently manually actuable and radially arranged keys on the support 2. These keys are respectively labeled 3–12. The support 2 has a common radial focal point 13 and a peripheral area 14 about the radial focal point 13. The keys 3–12 are radially arranged (along a closed curve) on the peripheral area 14 about the radial focal point 13. The functions/digits/letters assigned to the radially arranged keys 3–12 may be chosen for any particular arrangement. The common assignment is discussed below with reference to FIG. 5.

The radial arrangement of the keys 3–12 has an open center due to the radial distance of the keys from the focal point and the area bounded to the exterior by the keys is such to allow two other keys 15, 16 to be positioned on the support pad 2 within this area. The additional keys 15–16 have been respectively placed in an upper center position (above the focal point 13) and a lower center position (below the focal point).

Further keys 17, 18 are also provided for additional functions of the telephone. The keys 17, 18 form a partial and separate radial arrangement about a separate radial focal point 20. This second radial focal point 20 lies between the focal point 13 of the main radial arrangement and the upper end 23 of the key arrangement 1. A display will lie above upper end 23 when the keypad 1 is assembled into a telephone.

The key 19 is a scroll key allowing for scrolling to the left and right. It is provided to lie between the two additional keys 17, 18 and the display. As discussed above this results in a keypad arrangement which is easy navigable by tactile feedback as each key has a unique position with respect to the focal point 13. Keys 4 and 9 have the same orientation with respect to the keypad and thus the telephone into which the keypad may be incorporated. However their opposed positions on the radial arrangement is easily discernible by tactile sensing. This should allow for instance a number to be dialed without necessity for visual confirmation that the correct key has been selected each time.

In the arrangement of FIG. 1 and in FIG. 5, there are basically four rows of keys with three keys per row. The common digit assignment to each of these keys is described with reference to FIG. 5. The # and * symbols have also been assigned as illustrated in the Figures.

While the radially disposed, keys 3–12 do not form linearly aligned rows from left to right across the keypad as can be best seen from the side view of FIG. 2 and the plan view of FIG. 5. Nevertheless, the keys may be considered to lie generally in rows so that, as shown in FIG. 5. The keys 15, 16 provided at the center of the radial arrangement may also incorporated into this particular digit assignment.

In the arrangement of FIG. 5, the digit 1 is the first assigned to a key. In accordance with convention (for example the convention of reading of English language text from top left to bottom right) the upper most left key 3 has been assigned the digit 1 and the remaining digits are assigned moving from left to right across the keys so as the form a numbered dial. The digit 0 is last assigned.

As can be seen from each of FIGS. 1 to 6 and 7 the radially arranged keys 3–12 are elongate, each having a major axis 30 and a minor axis 31 as shown on key no. 3 in FIG. 1. The upper contact portions of the buttons 3–12, 15–16, 17–18, and indeed the scroll button 19 can all be considered to be elongate. They can be considered to be of an outline closed curve shape and in the embodiment are elliptical in shape. The radially disposed keys 3–12 are arranged on the pad 2 so that the major axes 30 of the keys can extend through the focal point 13 of the support. This will provide for the best positional feedback. The keys 3–12 are spaced apart equidistant from each other for symmetry and thus predictability of position as shown in FIGS. 1 to 5 and 7. FIGS. 1 to 5 and 7 show a preferred arrangement of at least twelve keys on the keypad. In this arrangement there are ten radially disposed keys about the focal point and two keys within the radial arrangement. Also provided on the keypad 1 are apertures 24 and notches 25 which mate the keypad with a corresponding front cover of a telephone.

As shown in the perspective view of FIG. 4, each of keys have formed on an underside thereof a peg 26. Pressing on any of the keys causes the peg 26, in a telephone assembly, to press on and actuate, an electronic circuit switch associated with the key. The button 19 has dual pegs 26 which are spaced apart, one of which is actuated by pressing on portion 21 of the button 19 the other being actuated by pressing on portion 22. As described above such dual action keys are normally employed for associated functions such as scrolling left and right or scrolling up or down.

Each of the keys is integrally formed with the pad 2. The base of the each key together with the pad 2 define an enclosed dished aperture 28 the periphery of which is indicated by the reference numeral 27 and as shown in FIG. 4. It is important for reliable use of the keypad that provision be made for the movement of air behind the dished aperture. In particular it is desirable that air can move from beneath a key when the key is pressed, and can subsequently re-enter the area beneath the key to allow the key to return to its normal position when manual pressure is removed. In order to allow this function a series of channels are provided. Connecting each of the dished apertures 28 is a discontinuous channel 35 which is interrupted by each of the keys. The channel 35 allows for communication of air between the dished apertures 28 beneath each key. Each of the keys near the outer edge of the pad 2 is provided with an exterior channel 36 which can communicate air to or from the exterior of the pad. A central channel 37 communicates air between those keys centrally located on the pad. The dished apertures 28 and the channels 35–37 allow for back lighting of the keypad 2. However specific provision for accommodating illuminating LEDs are rectangular depressions 34 in the pad 2.

As can been seen the upper contact portions of the keys are contoured or sloped in relation to the plane and to the position they hold on the keypad. In the preferred embodiment the keys stand tallest at a position on the key towards the center of the key pad, which center is the radial focal point, and become shorter at a position on the key towards the edge of the pad, which is farthest from the radial focal point. Specifically, the radially inward end 40 of each radially arranged keys 3–12 is taller than its radially outward end 41. The net effect is that the upper surface 42 of the key is sloped in a radially outward direction.

A similar contouring is also used for keys 17–19. While keys 17–19 are not in the main radial arrangement, they are located about a central axis of symmetry of the keypad 2. As best seen from FIG. 3, keys 17–19 are tallest at or about their central points 43 and are tapered downwardly towards their opposing edges 44. The overall effect is that the key formation is generally raised at the center of the keypad and tapers to a lower height towards the outer edge of the keypad. The key configuration thus has an overall domed or convex configuration.

One would appreciate that the contouring arrangement could easily be reversed so that the key configuration would be such that the radially arranged keys were shortest in a radially inward position for example about the radial focal point of the keypad and tallest at a radially outwardly position so that their upper surfaces define a concave surface as compared to the domed convex arrangement just described. Keys 17–19 could also be formed to be shortest toward the point 43.

FIG. 6 shows a front cover 50 for a telephone. The cover 50 comprises a protective shell 51 for fitting over a keypad and attachment to a body of a telephone as described below for FIG. 7. The protective shell 51 has defined therein a series of 10 radially arranged apertures labeled 52–61 which are designed to mate and register with keys 3–12 of keypad 1. Also provided are two central apertures 62 and 63 defined in the shell 51 for receiving keys 15 and 16 respectively. Additional apertures 64 and 65 are provided to accommodate keys 17 and 18 respectively. A further aperture 66 accommodates scroll key 19. The cover is designed so that when placed over the keypad the keys of the keypad and the apertures are in register so that the keys protrude through the front cover 50 (see FIG. 6). A window 67 defined on the upper end of the cover allows for the display of information from a display screen of the telephone. A further aperture 68 and various recesses 69 on the edge of the shell 50 accommodate such items as attachments for a screen cover or AC ports and other function keys.

The keypad 1 and the front cover 50 are assembled in a telephone 80 as shown in FIG. 7. It is desirable that the keypad is adapted to allow backlighting. This is desirable particularly in mobile telephones where the backlighting may be used to illuminate the keys. Backlighting may be achieved for example by LED's positioned on the telephone beneath the keypad. Good illumination of the keys is achieved where the keys are constructed of a material that is at least partially translucent and desirably at least partially transparent.

The telephone 80 has a telephone body 81 having a front 82, on which the keypad is mounted and over which the front cover 50 is placed, and a back 83. As can be seen in the drawings, the keypad 1 is on the body 81 with the keys of the keypad facing to the front of the telephone. The protective shell 51 of the front cover 50 fits over the keypad and is attached by snap fitting to the body 81 of the telephone. The keys are actuable as they project through the front cover 50 in the assembled configuration of the telephone.

In FIG. 7 an aesthetically pleasing arrangement is shown where the shape of the closed curve defined by the radial arrangement is carried through in the shape of the window cover 67 which is held in shell 51. This window cover has a thin coating which makes the entire window cover opaque with the exception of an oval shaped area 68. Area 68 forms a transparent area directly over a display screen. An AC port 85 is provided for connection of a charger etc. to the telephone.

The present examples and embodiments are to be considered in all respects as illustrative and not restrictive, and the invention is not to be limited to the details given herein. While described in detail here, many modifications and equivalents thereof will be clear to those persons of ordinary skill in the art and are intended to be covered hereby, the full measure of the spirit and scope of the invention being defined by the claims.

I claim:

1. An arrangement of keys all located in a common plane for a telephone comprising:

the plane having a radial focal point and a peripheral area about the focal point;

a set of twelve independently manually actuable keys arranged in the plane, in four rows or keys with three keys per row, each key with an upper contact surface;

ten of the twelve keys radially arranged on the peripheral area of the plane about the focal point of the plane along a path defining a closed curve;

two of the twelve keys located at opposite sides of the radial focal point within the peripheral area of the plane; and each key having means for tactily indicating the position of each key with respect to one another.

2. A key arrangement according to claim 1 wherein the radially arranged keys are in an elliptical array.

3. A key arrangement according to claim 1 wherein the tactile indicating means include a cross sectional shape of the upper contact surface of each key.

4. A key arrangement according to claim 3 wherein the cross sectional shape of the upper contact surface of each key includes a major axis and a minor axis.

5. A key arrangement according to claim 4 wherein the major axis of each radially arranged key is designed to extend through the radial focal point.

6. A key arrangement according to claim 4 wherein the cross sectional shape of the upper contact surface of each key has a closed curved shape.

7. A key arrangement according to claim 6 wherein the cross sectional shape of the upper contact surface of each key is oval.

8. A key arrangement according to claim 1 wherein the radially located keys are equidistantly spaced apart from one another.

9. A key arrangement according to claim 1 wherein the tactile indicating means includes a slope of the upper contact surface of each key.

10. A key arrangement according to claim 9 wherein the contact surface of each key has a slope creating one tall side and one short side, a line between the tall and short side of each radially located keys passing through the radial focal point of the plane.

11. A key arrangement according to claim 10 wherein the tall side of each radially located key is located closer to the radial focal point than the short side of the key.

12. A key arrangement according to claim 10 wherein the short side of each radially located key is located closer to the radial focal point than the tall side of the key.

13. A key arrangement according to claim 1 wherein one or more additional keys are provided.

14. A key arrangement according to claim 1 wherein all of the keys are formed in a single keypad.

* * * * *